United States Patent [19]

Thompson

[11] Patent Number: 5,749,387

[45] Date of Patent: May 12, 1998

[54] PORTABLE ICE FISHING HUT

[76] Inventor: Todd Thompson, 502 Birch Ave., Eldora, Iowa 50627

[21] Appl. No.: 779,445

[22] Filed: Jan. 7, 1997

[51] Int. Cl.$^6$ ............................................. E04H 15/48
[52] U.S. Cl. ........................... 135/146; 135/901; 135/150; 403/102; 403/315
[58] Field of Search .................... 135/900, 901, 135/149, 150, 88.14, 137, 116, 148, 128, 130, 141, 142, 143, 144, 146; 403/102, 100, 315, 325, 324, 378

[56] References Cited

U.S. PATENT DOCUMENTS

| | | | |
|---|---|---|---|
| 3,826,270 | 7/1974 | Hentges | 135/901 X |
| 3,874,398 | 4/1975 | Hendrickson | 135/901 X |
| 4,067,346 | 1/1978 | Husted | 135/901 X |
| 4,084,597 | 4/1978 | Compton . | |
| 4,612,948 | 9/1986 | Simpson | 135/900 X |
| 4,926,892 | 5/1990 | Osmonson et al. . | |
| 4,926,893 | 5/1990 | Klopfenstein et al. . | |
| 5,096,214 | 3/1992 | Walker et al. . | |
| 5,133,378 | 7/1992 | Tanasychuk . | |
| 5,577,799 | 11/1996 | St. Germain | 403/102 X |
| 5,622,198 | 4/1997 | Elsinger . | |

*Primary Examiner*—Lanna Mai

[57] ABSTRACT

A portable ice fishing hut consisting of sturdy plastic roof and floor shells secured together by collapsible supports. The walls of the hut are manufactured from a flexible skin, and the entire structure can be collapsed together for convenient storage and transport.

1 Claim, 4 Drawing Sheets

PORTABLE ICE FISHING HUT

BACKGROUND OF THE INVENTION

1. Field of the Invention

The present invention relates to portable, collapsible shelters and more particularly pertains to a shelter for use by ice fishermen.

2. Description of the Prior Art

The use of portable, collapsible ice fishing shelters is well known in the prior art. This is evidenced by the granting of a number of patents relating to various functional and structural aspects of portable ice fishing shelters. A typical example of a collapsible ice fishing shelter is to be found in U.S. Pat. No. 3,826,270 which issued to Hentges on Jul. 30, 1974. The ice fishing shelter shown in this patent comprises a collapsible frame and a flexible enclosure which is suspended from the frame within the confines thereof. The shelter utilizes at least ten foldable horizontal and vertical supports and around twelve diagonal supports, with all of these supports being interconnected to form the collapsible frame. The shelter is mounted on skids for easy transport and utilizes a flexible skin roof structure.

Another patent of interest is U.S. Pat. No. 5,341,588 which issued to Lizotte on Aug. 30, 1994. This patent discloses a portable ice fishing hut having a rigid, foldable housing base which both stores and supports a plurality of support members over which a flexible skin roof and wall assembly can be mounted. The base includes skids which facilitate a transporting of the hut over an icy surface.

U.S. Pat. No. 5,133,378, which issued to Tanasychuk on Jul. 28, 1992, discloses a completely collapsible frame for a portable shelter wherein top and bottom frame sections are held apart by an over-center linkage mechanism assisted by a cable retainer arrangement. A flexible skin cover can then be mounted over the frame structure to form the protective roof and wall sections.

U.S. Pat. No. 4,938,243, which issued to Foster on Jul. 3, 1990, is of interest as disclosing a foldable shelter having a flexible skin with an inner U-shaped support frame and a pair of resilient top support members attached to the exterior top of the skin.

A last patent of interest is U.S. Pat. No. 5,368,057 which issued to Lubkeman et al, on Nov. 29, 1994. This patent describes a collapsible ice fishing shelter having a thermoformed plastic base into which is mounted a collapsible frame which supports a flexible fabric covering to define the ice fishing enclosure. The rigid base includes a plurality of lateral depressions formed therein which stiffen the base and which serve as runners when the base is dragged along a frozen surface.

It will be noted that none of these patents disclose a portable ice fishing shelter that utilizes sturdy, thermoformed roof and floor shells which mate together and into which the flexible protective enclosure can be collapsed and stored when the shelter is not being used. As such, there apparently exists the need for a collapsible shelter which, when not being utilized, can be stored in a completely rigid container, thereby to facilitate its usage, storage, and transport. In this regard, the present invention substantially fulfills this need.

SUMMARY OF THE INVENTION

In view of the foregoing disadvantages inherent in the known types of ice fishing shelters now present in the prior art, the present invention provides an improved portable ice fishing hut. As such, the general purpose of the present invention, which will be described subsequently in greater detail, is to provide a new and improved portable ice fishing hut which has all the advantages of the prior art and none of the disadvantages.

To attain this, the present invention essentially comprises a portable ice fishing hut that consists of sturdy plastic roof and floor shells secured together by collapsible supports. The walls of the hut are manufactured from a flexible skin, and the entire structure can be collapsed together for convenient storage and transport.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is another object of the present invention to provide a new and improved portable ice fishing hut which may be easily and efficiently manufactured and marketed.

It is a further object of the present invention to provide a new and improved portable ice fishing hut which is of a durable and reliable construction.

An even further object of the present invention is to provide a new and improved portable ice fishing hut which is susceptible of a low cost of manufacture with regard to both materials and labor, and which accordingly is then susceptible of low prices of sale to the consuming public, thereby making such portable ice fishing hut economically available to the buying public.

Still yet another object of the present invention is to provide a new and improved portable ice fishing hut which provides in the apparatuses and methods of the prior art some of the advantages thereof, while simultaneously overcoming some of the disadvantages normally associated therewith.

Lastly, it is an object of the present invention to provide a new and improved portable ice fishing hut consisting of a sturdy plastic roof and floor shells secured together by collapsible supports. The walls of the hut are manufactured from a flexible skin, and the entire structure can be collapsed together for convenient storage and transport.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF PREFERRED EMBODIMENTS

Figure 1:
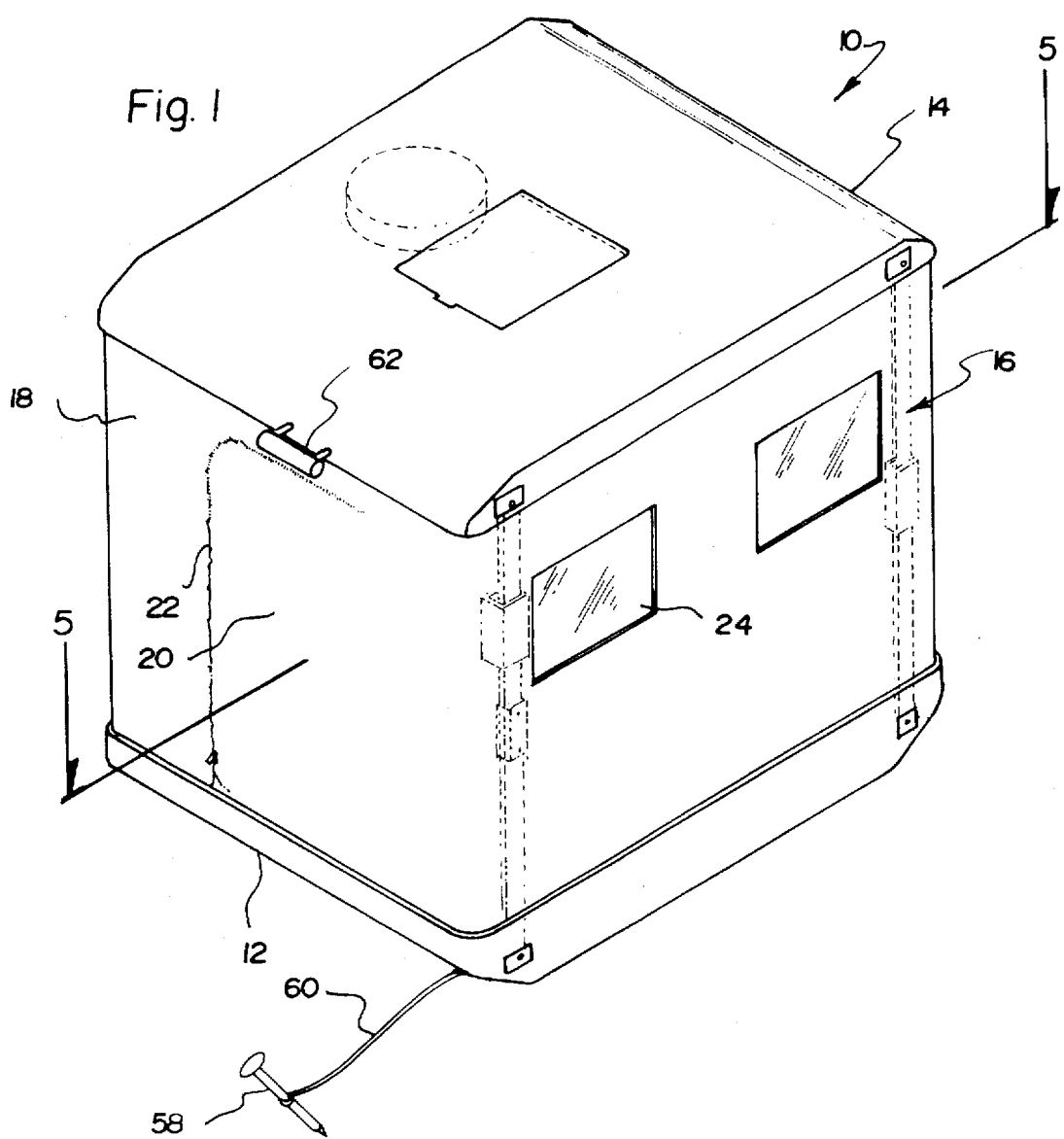
FIG. 1 is a perspective view of the portable ice fishing shelter comprising the present invention.

With reference now to the drawings, and in particular to FIG. 1 thereof, a new portable ice fishing shelter embodying the principles and concepts of the present invention and generally designated by the reference numeral 10 will be described.

More specifically, it will be noted that the portable ice fishing shelter 10 basically consists of a bottom plastic shell 12 which serves as a floor structure, a small top plastic shell 14 which serves as a roof structure, and a plurality of foldable vertical supports, each of which is generally designated by the reference numeral 16. A flexible fabric structure 18 is fixedly secured between the bottom and top shells 12, 14 respectively, so as to define a protective enclosure. The bottom plastic shell 12 and the top plastic shell 14 each include inwardly turned end portions. The inwardly turned end portions make the shelter more aerodynamic.

A flexible door 20 is positioned in the fabric 18 and is selectively openable and closeable by a zipper 22 which is installed in an obvious and understandable manner. A plurality of transparent plastic windows 24 are installed in the fabric 18 so as to facilitate the entry of sufficient light within the enclosure.

Figure 2:
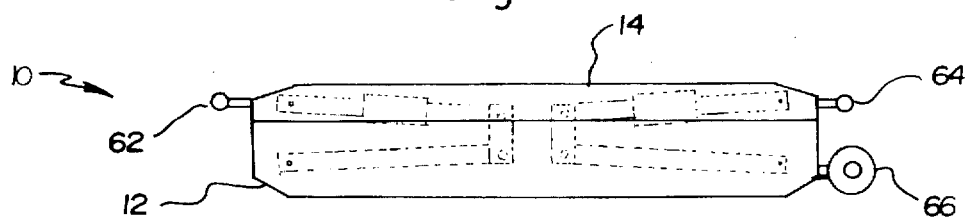
FIG. 2 is an end elevation view of the invention showing the same in a collapsed, stored condition.
Figure 3:
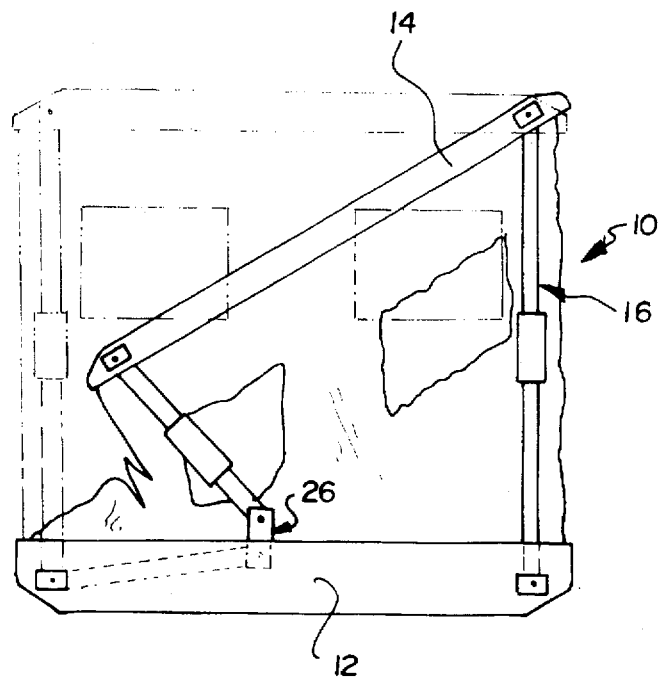
FIG. 3 is an end elevation view of the invention illustrating the method of erecting the shelter.

A novel feature of the invention 10 resides in the fact that the rigid, sturdy plastic shells 12, 14 are designed to be collapsed together, as best illustrated in FIG. 2, so as to define a complete protective housing for the flexible enclosure 18. The shells 12, 14 may be locked together by any conventional means, and their mating engagement is accomplished by the folding of the vertical supports 16 whereby the supports collapse and are stored within the engaged shells 12, 14. As shown in FIG. 3, the vertical supports 16 may be unfolded to erect the shelter 10, and the collapsing and extending of the supports 16 is achieved through a novel hinge structure 26 as will be subsequently described in greater detail.

Figure 4:
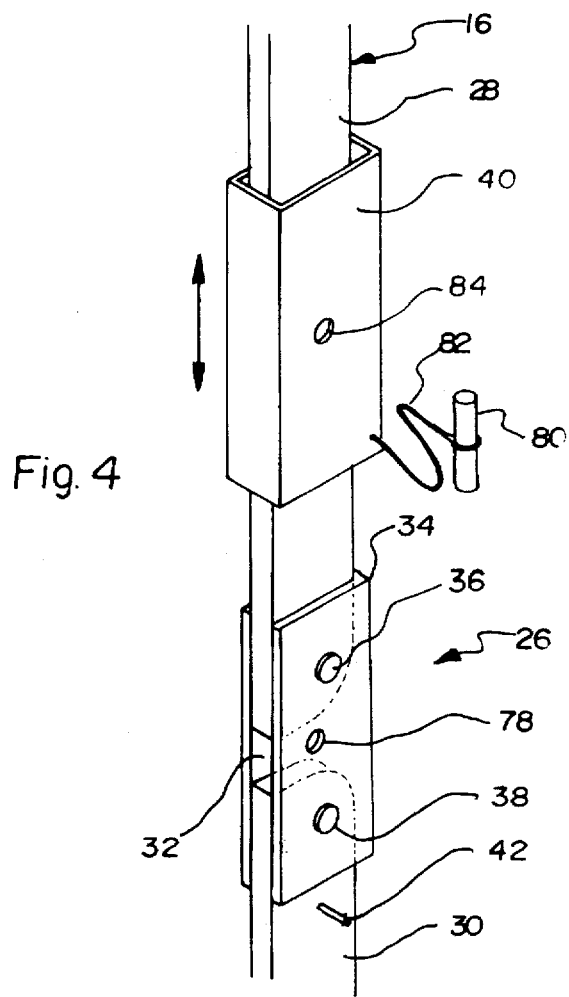
FIG. 4 is a partial perspective view of a first embodiment of hinge structures associated with the invention.

FIG. 4 of the drawings illustrates a first preferred embodiment of the hinge structure 26 which will be used in conjunction with the vertical supports 16, thereby to facilitate their folding and extending as desired. In this respect, it can be seen that each vertical support 16 consists of an upper arm 28 and a lower support arm 30 which are spaced apart by a distance 32.

A U-shaped channel member 34 is pivotally attached to each of the arms 28, 30 by respective pivot pins 36, 38 when the arms 28, 30 are in axial alignment. When the vertical support 16 is in an extended position, a slidable sleeve 40 may be dropped down over the hinge channel member 34 so as to prevent any undesired pivotal movement of the arms 28, 30, thereby to keep the arms in axial alignment and the shelter in a fully erected and useable position. Inasmuch as the sleeve 40 is slidable over the channel member 34, a sleeve stop 42 is positioned beneath the channel member 34 so as to prevent the sleeve from dropping downwardly on the arm 30 whereby it would not perform its intended function, i.e., the prevention of rotatable movement of the arms 28, 30 relative to the channel member 34. Any number of different types of sleeve stops 42 could be utilized to accomplish this positioning of the sleeve 40, to include the use of outwardly extending detents, integral grooves, a removable rubber band, etc., and all such types of stops are within the intent and purview of the present invention.

Figure 5:
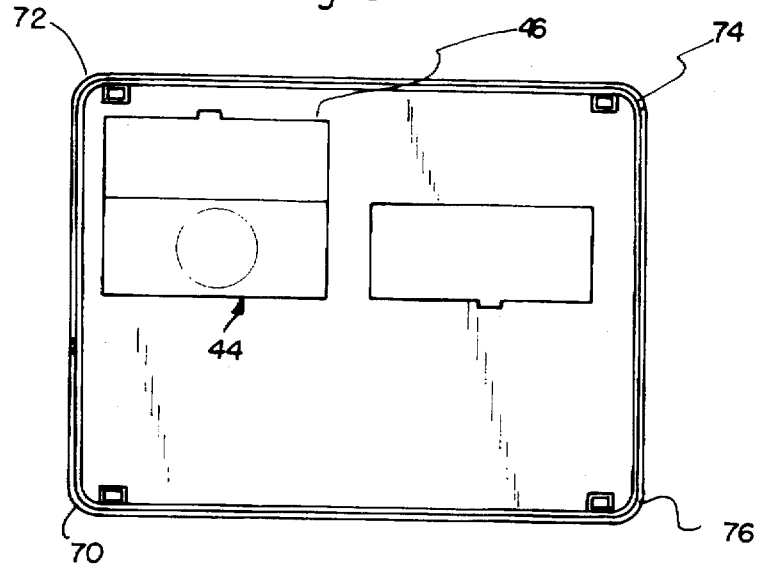
FIG. 5 is a cross-sectional view of the invention as viewed along the line 5—5 of FIG. 1.

FIG. 5 of the drawings illustrate the integral, preformed fishing access openings, each of which is generally designated by the reference numeral 44. As shown, each access opening 44 is integrally a part of the bottom shell 12. The openings 44 allow a fishing line to be directed downwardly therethrough which is selectively aligned with a hole cut through the surface of the supporting ice. Each of the openings 44 has a lid 46 hingedly disposed thereover. The lids 46 can be selectively opened to gain access to the openings 44.

Figure 6:
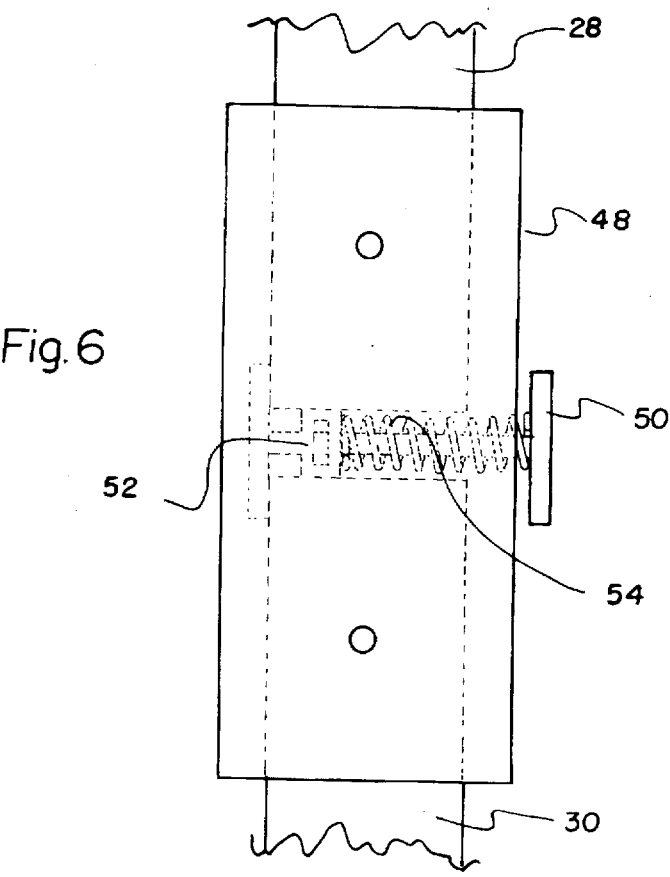
FIG. 6 is a partial plan view of a second embodiment of the hinge structure forming a part of the present invention.

FIG. 6 of the drawings illustrates a second embodiment of the hinge structure 26 which will be used in conjunction with the vertical supports 16, thereby to facilitate their folding and extending as desired. The upper arm 28 and the lower arm 30 are positioned with a fixed sleeve 48 thereover. A pin 50 extends through the sleeve 48 and between the upper and lower arms. A locking block 52 is disposed on a free end of the pin 50 and positioned between the upper and lower arms in a locked orientation. A spring 54 is disposed on the pin 50 and coupled with the locking block 52 for biasing the locking block in the locked orientation. Pushing inwardly on the pin will move the locking block from its position between the upper and lower arms thereby facilitating the folding of the vertical supports 16.

While the basic construction of the invention 10 has now been described with reference to FIGS. 1–6, a number of smaller features are disclosed in these drawings which are of an optional design and which could contribute significantly to the reliability and efficient use of the invention. For example, FIG. 1 illustrates the use of an ice stake 58 which is fixedly secured to the bottom shell 12 by a flexible tether 60. A plurality of these ice stakes 58 could be selectively secured around the outer surface of the shell 12 so that once the shell is positioned where desired on a frozen surface, the stakes could be driven into the ice to effect a firm retention of the invention 10 in place. In this regard, it can be appreciated that strong winds sometimes gust across frozen lakes and rivers, and the stakes 58 would operate to prevent the shelter 10 from being moved by such wind gusts.

Another optional feature of the invention 10 is the positioning of handles 62, 64 on opposed sides of the top shell 14 as shown in both FIGS. 1 and 2. These handles 62, 64 allow the collapsed shelter 10 to be easily transported by two individuals. Further, as shown in FIGS. 2 and 5, a pair of small wheels 66, 68 may be mounted to the bottom shell 12. The wheels 66, 68 are designed to engage the ground surface only when the collapsed shelter 10 is pivoted upwardly by a lifting on the handles, and the wheels allow the collapsed shelter to be easily rolled across the ground surface in a now apparent manner.

Another novel feature is illustrated in FIG. 5 whereby it can be seen that the corners 70, 72, 74, 76 of the bottom shell 12 are of a thickened construction so as to facilitate a strengthening of the complete shell structure while at the same time allowing for a more precise alignment of the shell 12 with the top shell 14. In the preferred embodiment, the top shell 14, while being formed of a rigid, sturdy plastic, can be of a thinner and smaller design so as to decrease its inherent weight. The top shell member 14 could similarly have thickened corners so as to even more accurately align the two shells 12, 14 when the shelter 10 is in a stored, collapsed condition.

Another optional feature of the invention 10 is shown in FIG. 4 where it can be seen that the U-shaped channel member 34 may have a centrally positioned through-extending aperture 78 which is designed to receive a slidable removable pin 80 attached to the sleeve 40 by a flexible tether 82. Once the sleeve 40 is positioned over the U-shaped channel member 34, the through-extending aperture 84 in the sleeve may be aligned with the aperture 78, and the pin 80 may then be directed through the aligned apertures 78, 84 so as to securely and lockably position the sleeve 40 over the channel member 34, thereby to prevent undesired pivotal movement of the arms 28, 30.

Figure 7:
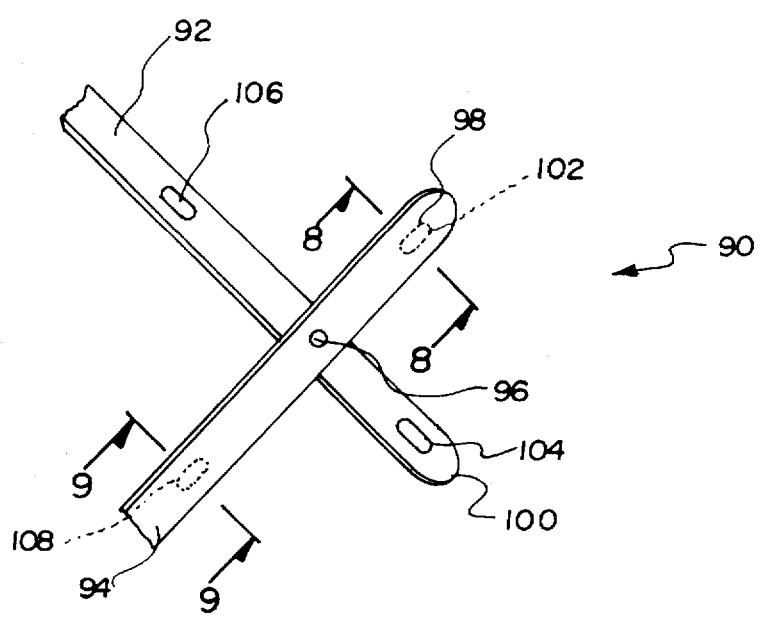
FIG. 7 is a partial plan view of a third embodiment of the hinge structure forming a part of the present invention.
Figure 8:
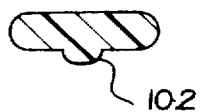
FIG. 8 is a cross-sectional view of the invention as viewed along line 8—8 of FIG. 7.
Figure 9:
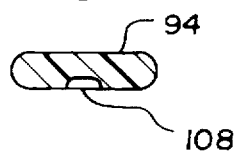
FIG. 9 is a cross-sectional view of the invention as viewed along line 9—9 of FIG. 7.

FIGS. 7, 8 and 9 illustrate an alternative embodiment 90 of the hinge structure 26 shown in FIG. 4. In this alternative embodiment 90, the arms 28, 30 shown in FIG. 4 are replaced by arms 92, 94. The arms 92, 94 overlap and are pivotally attached together by a pivot pin 96. The respective ends 98, 100 of the arms 92, 94 are provided with respective downwardly extending detents 102, 104. The detents 102, 104 are integrally molded into the plastic arms in a preferred embodiment, and an example of such detent 102 is shown in FIG. 9, with it being understood that the detent 104 is of an identical molded construction.

Similarly, each of the arms 92, 94 are provided with integral respective slots 106, 108, and an example of such slots is shown in FIG. 10 with it being understood that the slot 106 is of an identical construction in arm 92.

As can now be appreciated, when the arms 92, 94 are pivoted into an axially aligned position, the shelter 10 will be in an open extended condition. The arms 92, 94 are brought into locked engagement by the detent 102 and arm 94 becoming lockably engaged with the slot 106 while the detent 104 on arm 92 comes into similar engagement with the slot 108. The detents 102, 104 are retained within the respective slots 106, 108 by a deformable movement of the respective arms 92, 94 and with only a minimal effort being required to either engage or remove the detents from the slots.

Thus, an improved and more rapid erecting of the shelter 10 may be accomplished by the use of these alternative hinge structures 90 on each of the vertical supports.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A portable and collapsible shelter comprising:

a substantially rigid protective enclosure, said enclosure including a base shell and a roof shell, said base shell and said roof shell being conformingly engageable together to form said enclosure; said base shell includes at least one integral fishing access hole in a floor section, said access hole having a lid hingedly disposed thereover;

a collapsible support frame pivotally connected between said base shell and said roof shell, said collapsible support frame being substantially retained within said enclosure when said portable shelter is in a stored collapsed position;

said collapsible support frame includes at least one vertical support member, said vertical support member having a hinge joint to facilitate a collapsing thereof into a folded stored position; said vertical support member includes a first arm pivotally connected to said roof shell and a second arm pivotally connected to said base shell; said hinge joint being pivotally attaching the free end of said first arm to the free end of said second arm;

a hinge locking means securing said first arm and second arm in an axially aligned position whereby said shelter is maintained in an open operable position; said hinge locking means comprising the first arm and the second arm positioned within a fixed sleeve, a pin extending through the sleeve and between the first and second arms, a locking block disposed on a free end of the pin and positioned between the first and second arms in a locked orientation, a spring disposed on the pin and coupled with the locking block for biasing the locking block in the locked orientation whereby pushing inwardly on the pin will move the locking block from its position between the first and second arms thereby facilitating folding of the vertical supports;

a flexible covering connected between said base shell and said roof shell, said flexible covering being substantially retained within said enclosure when said portable shelter is in a stored collapsed position, said flexible covering functioning as walls for said shelter so as to define a protective enclosed space between said base shell and said roof shell when said shelter is in an open operable position.

* * * * *